US007429443B2

(12) United States Patent
Patel

(10) Patent No.: US 7,429,443 B2
(45) **Date of Patent: *Sep. 30, 2008**

(54) METHOD OF MAKING EMULSION AGGREGATION TONER

(75) Inventor: Raj D. Patel, Oakville (CA)

(73) Assignee: Xerox Corporation, Stamford, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 12/015,475

(22) Filed: Jan. 16, 2008

(65) Prior Publication Data

US 2008/0113291 A1 May 15, 2008

Related U.S. Application Data

(62) Division of application No. 11/187,007, filed on Jul. 22, 2005.

(51) Int. Cl.
*G03G 9/08* (2006.01)
*C08J 3/215* (2006.01)

(52) U.S. Cl. .................................. 430/137.14; 523/335

(58) Field of Classification Search ............ 430/137.14; 523/335

See application file for complete search history.

(56) References Cited

U.S. PATENT DOCUMENTS

| | | | | |
|---|---|---|---|---|
| 3,847,604 | A | 11/1974 | Hagenbach et al. | |
| 4,338,390 | A | 7/1982 | Lu | |
| 4,404,270 | A | 9/1983 | Higashida et al. | |
| 4,935,326 | A | 6/1990 | Creatura et al. | |
| 4,937,166 | A | 6/1990 | Creatura et al. | |
| 4,983,488 | A * | 1/1991 | Tan et al. | 430/137.14 |
| 5,278,020 | A | 1/1994 | Grushkin et al. | |
| 5,290,654 | A | 3/1994 | Sacripante et al. | |
| 5,308,734 | A | 5/1994 | Sacripante et al. | |
| 5,344,738 | A | 9/1994 | Kmiecik-Lawrynowicz et al. | |
| 5,346,797 | A | 9/1994 | Kmiecik-Lawrynowicz et al. | |
| 5,348,832 | A | 9/1994 | Sacripante et al. | |
| 5,364,729 | A | 11/1994 | Kmiecik-Lawrynowicz et al. | |
| 5,366,841 | A | 11/1994 | Patel et al. | |
| 5,370,963 | A | 12/1994 | Patel et al. | |
| 5,403,693 | A | 4/1995 | Patel et al. | |
| 5,405,728 | A | 4/1995 | Hopper et al. | |
| 5,418,108 | A | 5/1995 | Kmiecik-Lawrynowicz et al. | |
| 5,496,676 | A | 3/1996 | Croucher et al. | |
| 5,501,935 | A | 3/1996 | Patel et al. | |
| 5,527,658 | A | 6/1996 | Hopper et al. | |
| 5,585,215 | A | 12/1996 | Ong et al. | |
| 5,650,255 | A | 7/1997 | Ng et al. | |
| 5,650,256 | A | 7/1997 | Veregin et al. | |
| 5,723,253 | A | 3/1998 | Higashino et al. | |
| 5,744,520 | A | 4/1998 | Kmiecik-Lawrynowicz et al. | |
| 5,747,215 | A | 5/1998 | Ong et al. | |
| 5,763,133 | A | 6/1998 | Ong et al. | |
| 5,766,818 | A | 6/1998 | Smith et al. | |
| 5,804,349 | A | 9/1998 | Ong et al. | |
| 5,827,633 | A | 10/1998 | Ong et al. | |
| 5,840,462 | A | 11/1998 | Foucher et al. | |
| 5,853,944 | A | 12/1998 | Foucher et al. | |
| 5,869,215 | A | 2/1999 | Ong et al. | |
| 5,916,725 | A | 6/1999 | Patel et al. | |
| 6,120,967 | A | 9/2000 | Hopper et al. | |
| 6,210,853 | B1 * | 4/2001 | Patel et al. | 430/137.14 |
| 6,395,445 | B1 | 5/2002 | Toth et al. | |
| 6,500,597 | B1 | 12/2002 | Patel et al. | |
| 6,743,559 | B2 | 6/2004 | Combes et al. | |
| 6,756,176 | B2 | 6/2004 | Stegamat et al. | |
| 2001/0046636 | A1 | 11/2001 | Daimon et al. | |
| 2004/0175639 | A1 | 9/2004 | Matsushima et al. | |

* cited by examiner

*Primary Examiner*—Christopher RoDee
(74) *Attorney, Agent, or Firm*—Oliff & Berridge, PLC

(57) ABSTRACT

A polyester toner includes particles of a resin, a colorant, an optional wax, and a polyion coagulant, where the toner is prepared by an emulsion aggregation process.

12 Claims, No Drawings

METHOD OF MAKING EMULSION AGGREGATION TONER

This is a Division of application Ser. No. 11/187,007 filed Jul. 22, 2005. The disclosure of the prior application is hereby incorporated by reference herein in its entirety.

BACKGROUND

This present disclosure relates to toners and developers containing the toners for use in forming and developing images, and in particular to polyester emulsion/aggregation toners formed using polyions as coagulants. The disclosure also relates to processes for producing and using such toners and developers.

Emulsion aggregation toners are excellent toners to use in forming print and/or xerographic images in that the toners can be made to have uniform sizes and in that the toners are environmentally friendly. U.S. patents describing emulsion aggregation toners include, for example, U.S. Pat. Nos. 5,370,963, 5,418,108, 5,290,654, 5,278,020, 5,308,734, 5,344,738, 5,403,693, 5,364,729, 5,346,797, 5,348,832, 5,405,728, 5,366,841, 5,496,676, 5,527,658, 5,585,215, 5,650,255, 5,650,256, 5,501,935, 5,723,253, 5,744,520, 5,763,133, 5,766,818, 5,747,215, 5,827,633, 5,853,944, 5,804,349, 5,840,462, and 5,869,215, the entire disclosures of which are incorporated herein by reference.

Two main types of emulsion aggregation toners are known. First is an emulsion aggregation process that forms acrylate based, e.g., styrene acrylate, toner particles. See, for example, U.S. Pat. No. 6,120,967, the entire disclosure of which is incorporated herein by reference, as one example of such a process. Second is an emulsion aggregation process that forms polyester, e.g., sodio sulfonated polyester, toner particles. See, for example, U.S. Pat. No. 5,916,725, the entire disclosure of which is incorporated herein by reference, as one example of such a process.

Emulsion aggregation techniques typically involve the formation of an emulsion latex of the resin particles, which particles have a small size of from, for example, about 5 to about 500 nanometers in diameter, by heating the resin, optionally with solvent if needed, in water, or by making a latex in water using an emulsion polymerization. A colorant dispersion, for example of a pigment dispersed in water, optionally also with additional resin, is separately formed. The colorant dispersion is added to the emulsion latex mixture, and an aggregating agent or complexing agent is then added to form aggregated toner particles. The aggregated toner particles are heated to enable coalescence/fusing, thereby achieving aggregated, fused toner particles.

Addition of a coagulant during the emulsion/aggregation process is an important step, to assist in aggregation of the primary polymer, colorant, and the like particles. For example, U.S. Pat. No. 6,120,967, mentioned above, describes a process where styrene acrylate-based resins are used to form toner particles, and in which a cationic coagulant such as poly-aluminum chloride, aluminum sulfate, zinc sulfate, alum, and dialkyl benzenealkyl ammonium chloride is used as the coagulant. However, different coagulants are used in polyester-based resin emulsion/aggregation processes. For example, U.S. Pat. No. 5,916,725, also mentioned above, describes a process where polyester-based resins are used to form toner particles, and in which the coagulant is a small organic amine, such as 2-methyl-1,5-pentanediamine.

In other polyester-based resin emulsion/aggregation processes, zinc acetate has been extensively used as a coagulant. See, for example, U.S. Pat. Nos. 6,500,597, 6,743,559, and 6,756,176, which disclose the use of metal salts, such as aluminum sulfate, aluminum chloride, zinc sulfate, magnesium sulfate, magnesium chloride, potassium-aluminum sulfate, or zinc acetate, as coagulants for producing polyester toners in emulsion/aggregation processes.

However, a problem exists with the use of such metal salts as zinc acetate in producing polyester toners. In particular, only a small proportion of the zinc acetate, about 2 to 3 weight %, gets incorporated into the toner particles. The remaining zinc acetate is in the aqueous phase, and must be filtered and separated before the aqueous phase can be discharged into the environment. This separation thus adds a significant cost to the toner production and waste disposal. The low rate of incorporation of zinc acetate into the toner particles is believed to be primarily due to its high solubility in water and the partial dissociation of the zinc acetate However, coagulants such as polyions have not previously been used in producing polyester toners, such as sulfonated polyester toners, because the sulfonate groups on the polyester resin particles are not sufficient to provide a controlled aggregation or coalescence in the presence of the more active polyion coagulants.

Accordingly, there is a need in the art for improved emulsion aggregation toner processes, particularly for use with polyester toner particles, that provide an efficient, controlled process without increasing the separation and disposal costs.

SUMMARY

The present disclosure addresses these and other needs, by providing improved coagulants and processes for making polyester emulsion/aggregation toner compositions. The disclosure provides more efficient coagulant materials, in that a higher amount of the coagulant is incorporated into the aggregated toner particles, thereby improving process efficiency, reducing process cost, and reducing waste processing.

In embodiments, the present disclosure provides a toner comprising particles of a resin, a colorant, an optional wax, and a polyion coagulant, wherein said toner is prepared by an emulsion aggregation process.

In another embodiment, the present disclosure provides a process for preparing a toner, comprising:

mixing a resin emulsion, a colorant dispersion, and an optional wax to form a mixture;

adding an organic or an inorganic acid to said mixture;

adding a polyion coagulant to said mixture;

heating the mixture, permitting aggregation and coalescence of said resin and colorant, and optionally cooling the mixture and isolating the product, wherein the polyion coagulant is added to said mixture at least one of before or during said heating.

In embodiments, the present disclosure also provides methods for making developers incorporating such toners, as well as development processes using the toners and developers.

DETAILED DESCRIPTION OF EXEMPLARY EMBODIMENTS

The toner of the present disclosure is comprised of toner particles comprised of at least a latex emulsion polyester polymer resin and a colorant dispersion. The toner particles may also include at least a wax dispersion and other conventional optional additives, such as colloidal silica (as a flow agent) and the like. The toner is made using a polyion as a coagulant during the aggregation phase of the process.

The specific latex for resin, polymer or polymers selected for the toner of the present disclosure include polyester and/or its derivatives, including polyester resins and branched polyester resins, polyimide resins, branched polyimide resins, poly(styrene-acrylate) resins, crosslinked poly(styrene-acrylate) resins, poly(styrene-methacrylate) resins, crosslinked poly(styrene-methacrylate) resins, poly(styrene-butadiene) resins, crosslinked poly(styrene-butadiene) resins, alkali sulfonated-polyester resins, branched alkali sulfonated-polyester resins, alkali sulfonated-polyimide resins, branched alkali sulfonated-polyimide resins, alkali sulfonated poly(styrene-acrylate) resins, crosslinked alkali sulfonated poly(styrene-acrylate) resins, poly(styrene-methacrylate) resins, crosslinked alkali sulfonated-poly(styrene-methacrylate) resins, alkali sulfonated-poly(styrene-butadiene) resins, crosslinked alkali sulfonated poly(styrene-butadiene) resins, and the like. In an embodiment, for example, a particularly referred resin is a polyester, such as a sulfonated polyester.

Illustrative examples of polymer resins selected for the process and particles of the present disclosure include any of the various polyesters, such as polyethylene-terephthalate, polypropylene-terephthalate, polybutylene-terephthalate, polypentylene-terephthalate, polyhexylene-terephthalate, polyheptadene-terephthalate, polyoctalene-terephthalate, polyethylene-sebacate, polypropylene sebacate, polybutylene-sebacate, polyethylene-adipate, polypropylene-adipate, polybutylene-adipate, polypentylene-adipate, polyhexylene-adipate, polyheptadene-adipate, polyoctalene-adipate, polyethylene-glutarate, polypropylene-glutarate, polybutylene-glutarate, polypentylene-glutarate, polyhexylene-glutarate, polyheptadene-glutarate, polyoctalene-glutarate polyethylene-pimelate, polypropylene-pimelate, polybutylene-pimelate, polypentylene-pimelate, polyhexylene-pimelate, polyheptadene-pimelate, poly(propoxylated bisphenol-fumarate), poly(propoxylated bisphenol-succinate), poly (propoxylated bisphenol-adipate), poly(propoxylated bisphenol-glutarate), SPAR™ (Dixie Chemicals), BECKOSOL™ (Reichhold Chemical Inc), ARAKOTE™ (Ciba-Geigy Corporation), HETRON™ (Ashland Chemical), PARAPLEX™ (Rohm & Hass), POLYLITE™ (Reichhold Chemical Inc), PLASTHALL™ (Rohm & Hass), CYGAL™ (American Cyanamide), ARMCO™ (Armco Composites), ARPOL™ (Ashland Chemical), CELANEX™ (Celanese Eng), RYNITE™ (DuPont), STYPOL™ (Freeman Chemical Corporation) mixtures thereof and the like. The resins can also be functionalized, such as carboxylated, sulfonated, or the like, and particularly such as sodio sulfonated, if desired.

In embodiments, a sulfonated polyester resin such as a sodio sulfonated polyester resin is preferred. When used, the sulfonated polyester resin can have any desired degree of sulfonation. For example, the sulfonation degree can be from about 0.1 to about 20 percent, such as from about 0.3 to about 6 percent.

The latex polymer may be present in an amount of from about 70 to about 95% by weight of the toner particles (i.e., toner particles exclusive of external additives) on a solids basis, such as from about 75 to about 85% by weight of the toner. However, amounts outside of these ranges can be used, in embodiments, depending upon the type and amounts of other materials present.

The monomers used in making the selected polymer are not limited, and the monomers utilized may include any one or more of, for example, ethylene, propylene, and the like. Known chain transfer agents, for example dodecanethiol or carbon tetrabromide, can be utilized to control the molecular weight properties of the polymer. Any suitable method for forming the latex polymer from the monomers may be used without restriction.

Various suitable colorants can be employed in toners of the present disclosure, including suitable colored pigments, dyes, and mixtures thereof, including carbon black, such as REGAL 330 carbon black, acetylene black, lamp black, aniline black, Chrome Yellow, Zinc Yellow, SICOFAST Yellow, SUNBRITE Yellow, LUNA Yellow, NOVAPERM Yellow, Chrome Orange, BAYPLAST Orange, Cadmium Red, LITHOL Scarlet, HOSTAPERM Red, FANAL PINK, HOSTAPERM Pink, LUPRETON Pink, LITHOL Red, RHODAMINE Lake B, Brilliant Carmine, HELIOGEN Blue, HOSTAPERM Blue, NEOPAN Blue, PV Fast Blue, CINQUASSI Green, HOSTAPERM Green, titanium dioxide, cobalt, nickel, iron powder, SICOPUR 4068 FF, and iron oxides such as MAPICO Black (Columbia) NP608 and NP604 (Northern Pigment), BAYFERROX 8610 (Bayer), M08699 (Mobay), TMB-100 (Magnox), mixtures thereof and the like.

The colorant, such as carbon black, cyan, magenta and/or yellow colorant, is incorporated in an amount sufficient to impart the desired color to the toner. In general, pigment or dye is employed in an amount ranging from about 2% to about 35% by weight of the toner particles on a solids basis, such as from about 5% to about 25% by weight or from about 5 to about 15% by weight. However, amounts outside these ranges can also be used, in embodiments.

Of course, as the colorants for each color are different, the amount of colorant present in each type of color toner typically is different. For example, in some embodiments of the present disclosure, a cyan toner may include about 3 to about 11% by weight of colorant (such as Pigment Blue 15:3 from SUN), a magenta toner may include about 3 to about 15% by weight of colorant (such as Pigment Red 122, Pigment Red 185, Pigment Red 238, and/or mixtures thereof), a yellow toner may include about 3 to about 10% by weight of colorant (such as Pigment Yellow 74), and a black toner may include about 3 to about 10% by weight of colorant (such as carbon black).

In addition to the latex polymer binder and the colorant, the toners of the present disclosure may also optionally contain a wax, typically provided in a wax dispersion, which wax dispersion can be of a single type of wax or a mixture of two or more preferably different waxes. A single wax can be added to toner formulations, for example, to improve particular toner properties, such as toner particle shape, presence and amount of wax on the toner particle surface, charging and/or fusing characteristics, gloss, stripping, offset properties, and the like. Alternatively, a combination of waxes can be added to provide multiple properties to the toner composition.

When a wax dispersion is used, the wax dispersion can include any of the various waxes conventionally used in emulsion aggregation toner compositions. Suitable examples of waxes include, but are not limited to, polyethylene, polypropylene, polyethylene/amide, polyethylenetetrafluoroethylene, and polyethylenetetrafluoroethylene/amide. Other examples include, for example, polyolefin waxes, such as polyethylene waxes, including linear polyethylene waxes and branched polyethylene waxes, and polypropylene waxes, including linear polypropylene waxes and branched polypropylene waxes; paraffin waxes; Fischer-Tropsch waxes; amine waxes; silicone waxes; mercapto waxes; polyester waxes; urethane waxes; modified polyolefin waxes (e.g., a carboxylic acid-terminated polyethylene wax or a carboxylic acid-terminated polypropylene wax); amide waxes, such as aliphatic polar amide functionalized waxes; aliphatic waxes consisting of esters of hydroxylated unsaturated fatty acids; high acid waxes, such as high acid montan waxes; microcrystalline waxes, such as waxes derived from distillation of crude oil; and the like. By “high acid waxes” it is meant a wax material that has a high acid content. The waxes can be crystalline or non-crystalline, as desired, although crystalline waxes are preferred, in embodiments. By “crystalline polymeric waxes” it is meant that a wax material contains an ordered array of polymer chains within a polymer matrix that can be characterized by a crystalline melting point transition temperature, Tm. The crystalline melting temperature is the melting temperature of the crystalline domains of a polymer sample. This is in contrast to the glass transition temperature, Tg, which characterizes the temperature at which polymer chains begin to flow for the amorphous regions within a polymer.

To incorporate the wax into the toner, it is preferable for the wax to be in the form of one or more aqueous emulsions or dispersions of solid wax in water, where the solid wax particle size is usually in the range of from about 100 to about 500 nm.

The toners may contain the wax in any amount of from, for example, about 3 to about 15% by weight of the toner, on a dry basis. For example, the toners can contain from about 5 to about 11% by weight of the wax.

The toners of the present disclosure may also contain a coagulant. A variety of coagulants are known in the art, as described above. However, the disclosure relates to the specific selection of polyions, or multivalent ions, as coagulants in forming the toner compositions. As used herein, “polyion coagulant” refers to a coagulant that is a salt or oxide, preferably a metal salt or metal oxide, formed from a metal species having a valence of at least 3, and preferably at least 4 or 5. Suitable coagulants thus include, for example, coagulants based on aluminum such as polyaluminum halides such as polyaluminum fluoride and polyaluminum chloride (PAC), polyaluminum silicates such as polyaluminum sulfosilicate (PASS), polyaluminum hydroxide, polyaluminum phosphate, and the like. Other suitable coagulants include, but are not limited to, tetraalkyl titinates, dialkyltin oxide, tetraalkyltin oxide hydroxide, dialkyltin oxide hydroxide, aluminum alkoxides, alkylzinc, dialkyl zinc, zinc oxides, stannous oxide, dibutyltin oxide, dibutyltin oxide hydroxide, tetraalkyl tin, and the like. Such polyion coagulants may have any desired number of polyion atoms present. For example, preferred polyaluminum compounds in embodiments have from about 2 to about 13, such as from about 3 to about 8, aluminum ions present in the compound Such polyion coagulants are preferred, in embodiments, because they are more highly incorporated into the toner particles during particle aggregation, and thus less of the coagulant remains in solution requiring extra subsequent waste processing. For example, in embodiments, at least about 50%, such as at least about 75% or at least about 80% by weight of the polyion coagulant is incorporated into the toner particles during particle aggregation, meaning that less than about 50%, such as less than about 25% or less than about 20%, respectively, of the coagulant remains in solution after completion of particle aggregation. In one embodiment, as high as about 90% or more of the polyion coagulant is incorporated into the toner particles during particle aggregation, meaning that less than about 10% of the coagulant remains in solution after completion of particle aggregation.

The coagulant is present in the toner particles, exclusive of external additives and on a dry weight basis, in amounts of from 0 to about 5% by weight of the toner particles, such as from about greater than 0 to about 3% by weight of the toner particles.

The toner may also include additional known positive or negative charge additives in effective suitable amounts of, for example, from about 0.1 to about 5 weight percent of the toner, such as quaternary ammonium compounds inclusive of alkyl pyridinium halides, bisulfates, organic sulfate and sulfonate compositions such as disclosed in U.S. Pat. No. 4,338,390, cetyl pyridinium tetrafluoroborates, distearyl dimethyl ammonium methyl sulfate, aluminum salts or complexes, and the like.

Also, in preparing the toner by the emulsion aggregation procedure, one or more surfactants may be used in the process. Suitable surfactants include anionic, cationic and nonionic surfactants. In embodiments, the use of anionic and nonionic surfactants are preferred to help stabilize the aggregation process in the presence of the polyion coagulant, which otherwise could lead to aggregation instability.

Anionic surfactants include sodium dodecylsulfate (SDS), sodium dodecyl benzene sulfonate, sodium dodecylnaphthalene sulfate, dialkyl benzenealkyl, sulfates and sulfonates, abitic acid, and the NEOGEN brand of anionic surfactants. An example of a suitable anionic surfactant is NEOGEN RK available from Daiichi Kogyo Seiyaku Co. Ltd., or TAYCA POWER BN2060 from Tayca Corporation (Japan), which consists primarily of branched sodium dodecyl benzene sulphonate.

Examples of cationic surfactants include dialkyl benzene alkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$ trimethyl ammonium bromides, halide salts of quaternized polyoxyethylalkylamines, dodecyl benzyl triethyl ammonium chloride, MIRAPOL and ALKAQUAT available from Alkaril Chemical Company, SANISOL (benzalkonium chloride), available from Kao Chemicals, and the like. An example of a suitable cationic surfactant is SANISOL B-50 available from Kao Corp., which consists primarily of benzyl dimethyl alkonium chloride.

Examples of nonionic surfactants include polyvinyl alcohol, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy)ethanol, available from Rhone-Poulenc Inc. as IGEPAL CA-210, IGEPAL CA-520, IGEPAL CA-720, IGEPAL CO-890, IGEPAL CO-720, IGEPAL CO-290, IGEPAL CA-210, ANTAROX 890 and ANTAROX 897. An example of a suitable nonionic surfactant is ANTAROX 897 available from Rhone-Poulenc Inc., which consists primarily of alkyl phenol ethoxylate.

Any suitable emulsion aggregation procedure may be used in forming the emulsion aggregation toner particles without restriction. These procedures typically include the basic process steps of at least aggregating an emulsion containing binder, one or more colorants, one or more surfactants, a polyion coagulant, optionally a wax emulsion, and one or more additional optional additives to form aggregates, subsequently coalescing or fusing the aggregates, and then recovering, optionally washing and optionally drying the obtained emulsion aggregation toner particles.

In an embodiment, the process comprises mixing a polyester-based resin emulsion with a colorant in the presence of a polyion coagulant, an acid and one or more surfactants, and thereafter heating the mixture resulting in metal ions generated from the reaction between the polyion coagulant and the acid to effect aggregation/coalescence of the emulsion particles and colorant to form coalesced toner particles of resin and colorant.

An exemplary process for producing the toner particles comprises the following steps.

First, an emulsion latex is provided (or generated), comprised of polyester-based resin particles, such as sodio sulfonated polyester resin particles. The latex is preferably heated in water to a temperature of, for example, from about 65° C. to about 90° C.

Second, a colorant dispersion is added, preferably with shearing, to the resin latex. The colorant dispersion can comprise, for example, from about 20 to about 50 percent of a predispersed colorant in water. An organic or an inorganic acid, and one or more surfactants, are also added to the mixture of the resin and colorant dispersions. If desired, the mixture can be heated to a desired temperature in preparation for a subsequent aggregation reaction, such as a temperature of from about 45° C. to about 65° C. Other optional additives and/or dispersions can also be included, such as a wax dispersion, a second or additional resin dispersion, and the like. The shearing can be conducted, for example, by homogenizing at from about 1,000 revolutions per minute to about 10,000 revolutions per minute, at a temperature of from about 25° C. to about 35° C., and for a duration of from about 1 minute to about 120 minutes. As desired, the mixture can also comprise other components, such as an optional wax, and the like.

Third, a polyion coagulant, as described above, is added to the mixture. The polyion coagulant, which is preferably water insoluble, releases metal ions and permits aggregation and coalescence of the resin and colorant particles, resulting in formation of toner particles of from about 2 to about 25 microns, such as from about 3 to about 15 microns, in volume average diameter. The geometric size distribution of the resultant particles can, in embodiments, be less than about 1.40 or less than about 1.25, such as from about 1.15 to about 1.40.

Preferably, in embodiments, the polyion coagulant is added to the mixture before the mixture is heated to cause aggregation and coalescence of the resin and colorant dispersions. For example, the polyion coagulant can be added to the mixture at any time before heating, such as during mixing of the individual components to form a mixture or after the individual components are mixed together, but prior to heating. Alternatively, the polyion coagulant can be added during the heating process, such as concurrent with or after starting of the heating process, although it is preferred that the polyion coagulant is added before the final aggregation/coalescence temperature is reached. If desired, the polyion coagulant can be added to the mixture both before and during the heating step. Also if desired, the polyion coagulant or an additional amount of the same or different polyion coagulant can alternatively be added during or after the heating step.

Fourth, one or more optional steps can be conducted following aggregation of the toner particles. For example, the mixture can be cooled, such as to near room temperature, and the toner product isolated from the reaction medium.

In the above process, the aggregation and coalescence temperature can be at any suitable temperature, such as from about 45° C. to about 80° C., or from about 50° C. to about 75° C.

The organic or an inorganic acid suitable for use in the process is not particularly limited. Examples of such acids include, but are not limited to, inorganic acids such as hydrochloric acid, nitric acid, sulfuric acid, and phosphoric acid, and organic acids such as citric acid and acetic acid.

The polyion coagulant can be added to the emulsion mixture in any suitable and desirable amount. However, in embodiments, the polyion coagulant is added to the emulsion mixture in an amount of from about 0.05 to about 10 percent by weight, such as from about 0.1 or from about 0.2 to about 1 or to about 5 percent, by weight of the amount of the resin. Amounts outside these ranges can also be used.

Toner particles formed in the foregoing processes, and modification thereof, can be isolated by any suitable means known in the art. For example, isolation can be conducted by filtration, wet sieving, classification, washing, drying, or the like.

The toner particles of the present disclosure can be made to have the following physical properties when no external additives are present on the toner particles.

The toner particles can have a surface area, as measured by the well known BET method, of about 1.3 to about 6.5 $m^2/g$. For example, for cyan, yellow and black toner particles, the BET surface area is less than 2 $m^2/g$, such as from about 1.4 to about 1.8 $m^2/g$, and for magenta toner, from about 1.4 to about 6.3 $m^2/g$.

It is also desirable to control the toner particle size and limit the amount of both fine and coarse toner particles in the toner. In an embodiment, the toner particles have a very narrow particle size distribution with a lower number ratio geometric standard deviation (GSD) of approximately 1.15 to approximately 1.30, or approximately less than 1.25. The toner particles of the present disclosure also can have a size such that the upper geometric standard deviation (GSD) by volume is in the range of from about 1.15 to about 1.30, such as from about 1.18 to about 1.22, or less than 1.25. These GSD values for the toner particles of the present disclosure indicate that the toner particles are made to have a very narrow particle size distribution.

Shape factor is also an important control process parameter associated with the toner being able to achieve optimal machine performance. The toner particles can have a shape factor of about 105 to about 170, such as about 110 to about 160, SF1*a. Scanning electron microscopy (SEM) is used to determine the shape factor analysis of the toners by SEM and image analysis (IA) is tested. The average particle shapes are quantified by employing the following shape factor (SF1*a) formula: $SF1{*}a=100\pi d^2/(4A)$, where A is the area of the particle and d is its major axis. A perfectly circular or spherical particle has a shape factor of exactly 100. The shape factor SF1*a increases as the shape becomes more irregular or elongated in shape with a higher surface area. In addition to measuring shape factor SF, another metric to measure particle circularity is being used on a regular bases. This is a faster method to quantify the particle shape. The instrument used is an FPIA-2100 manufactured by Sysmex. For a completely circular sphere the circularity would be 1.000. The toner particles can have circularity of about 0.920 to 0.990 and, such as from about 0.940 to about 0.975.

In addition to the foregoing, the toner particles of the present disclosure also have the following rheological and flow properties. First, the toner particles can have the following molecular weight values, each as determined by gel permeation chromatography (GPC) as known in the art. The binder of the toner particles can have a weight average molecular weight, Mw of from about 15,000 daltons to about 90,000 daltons.

Overall, the toner particles in embodiments have a weight average molecular weight (Mw) in the range of about 17,000 to about 60,000 daltons, a number average molecular weight (Mn) of about 9,000 to about 18,000 daltons, and a MWD of about 2.1 to about 10. MWD is a ratio of the Mw to Mn of the toner particles, and is a measure of the polydispersity, or width, of the polymer. For cyan and yellow toners, the toner particles in embodiments can exhibit a weight average molecular weight (Mw) of about 22,000 to about 38,000 daltons, a number average molecular weight (Mn) of about 9,000 to about 13,000 daltons, and a MWD of about 2.2 to about 10. For black and magenta, the toner particles in embodiments can exhibit a weight average molecular weight (Mw) of about 22,000 to about 38,000 daltons, a number average molecular weight (Mn) of about 9,000 to about 13,000 daltons, and a MWD of about 2.2 to about 10.

Further, the toners if desired can have a specified relationship between the molecular weight of the latex binder and the molecular weight of the toner particles obtained following the emulsion aggregation procedure. As understood in the art, the binder undergoes crosslinking during processing, and the extent of crosslinking can be controlled during the process. The relationship can best be seen with respect to the molecular peak values for the binder. Molecular peak is the value that represents the highest peak of the weight average molecular weight. In the present disclosure, the binder can have a molecular peak (Mp) in the range of from about 22,000 to about 30,000 daltons, such as from about 22,500 to about 29,000 daltons. The toner particles prepared from such binder also exhibit a high molecular peak, for example of about 23,000 to about 32,000, such as about 23,500 to about 31,500 daltons, indicating that the molecular peak is driven by the properties of the binder rather than another component such as the colorant.

Another property of the toners of the present disclosure is the cohesivity of the particles prior to inclusion of any external additives. The greater the cohesivity, the less the toner particles are able to flow. The cohesivity of the toner particles, prior to inclusion of any external additives, may be from, for example, about 55 to about 98% for all colors of the toner. Cohesivity was measured by placing a known mass of toner, two grams, on top of a set of three screens, for example with screen meshes of 53 microns, 45 microns, and 38 microns in order from top to bottom, and vibrating the screens and toner for a fixed time at a fixed vibration amplitude, for example for 90 seconds at a 1 millimeter vibration amplitude. A device to perform this measurement is a Hosokawa Powders Tester, available from Micron Powders Systems. The toner cohesion value is related to the amount of toner remaining on each of the screens at the end of the time, and is calculated by the formula: % cohesion=50*A+30*B+10*C, where A, B and C are respectively the weight of the toner remaining on the 53 microns, 45 microns, and 38 microns screens, respectively. A cohesion value of 100% corresponds to all of the toner remaining on the top screen at the end of the vibration step and a cohesion value of zero corresponds to all of the toner passing through all three screens, that is, no toner remaining on any of the three screens at the end of the vibration step. The higher the cohesion value, the lesser the flowability of the toner.

Finally, the toner particles in embodiments have a bulk density of from about 0.22 to about 0.34 g/cc and a compressibility of from about 33 to about 51.

The toner particles can be blended with external additives following formation. Any suitable surface additives may be used in embodiments. Most suitable are one or more of $SiO_2$, metal oxides such as, for example, $TiO_2$ and aluminum oxide, and a lubricating agent such as, for example, a metal salt of a fatty acid (e.g., zinc stearate (ZnSt), calcium stearate) or long chain alcohols such as UNILIN 700, as external surface additives. In general, silica is applied to the toner surface for toner flow, tribo enhancement, admix control, improved development and transfer stability and higher toner blocking temperature. $TiO_2$ is applied for improved relative humidity (RH) stability, tribo control and improved development and transfer stability. Zinc stearate is optionally also used as an external additive for the toners of the disclosure, the zinc stearate providing lubricating properties. Zinc stearate provides developer conductivity and tribo enhancement, both due to its lubricating nature. In addition, zinc stearate enables higher toner charge and charge stability by increasing the number of contacts between toner and carrier particles. Calcium stearate and magnesium stearate provide similar functions. In embodiments, a commercially available zinc stearate known as Zinc Stearate L, obtained from Ferro Corporation, can be used. The external surface additives can be used with or without a coating.

A particular advantage of embodiments is that the above external additives, or others, can be added to the aggregated toner particles and effectively form a thin shell on the toner particles. Because larger amounts of the coagulant remains as part of the toner particles, the coagulant species provide sites for increased attachment of the external additives to the aggregated particles. This increased attachment can result in formation of a shell around the toner particles, not possible with previously known coagulant materials.

In embodiments, the toners contain from, for example, about 0.1 to about 5 weight percent titania, about 0.1 to about 8 weight percent silica and about 0.1 to about 4 weight percent zinc stearate.

The toner particles of the disclosure can optionally be formulated into a developer composition by mixing the toner particles with carrier particles. Illustrative examples of carrier particles that can be selected for mixing with the toner composition prepared in accordance with the present disclosure include those particles that are capable of triboelectrically obtaining a charge of opposite polarity to that of the toner particles. Accordingly, in one embodiment the carrier particles may be selected so as to be of a negative polarity in order that the toner particles that are positively charged will adhere to and surround the carrier particles. Illustrative examples of such carrier particles include iron, iron alloys, steel, nickel, iron ferrites, including ferrites that incorporate strontium, magnesium, manganese, copper, zinc, and the like, magnetites, and the like. Additionally, there can be selected as carrier particles nickel berry carriers as disclosed in U.S. Pat. No. 3,847,604, the entire disclosure of which is totally incorporated herein by reference, comprised of nodular carrier beads of nickel, characterized by surfaces of reoccurring recesses and protrusions thereby providing particles with a relatively large external area. Other carriers are disclosed in U.S. Pat. Nos. 4,937,166 and 4,935,326, the disclosures of which are totally incorporated herein by reference.

The selected carrier particles can be used with or without a coating, the coating generally being comprised of acrylic and methacrylic polymers, such as methyl methacrylate, acrylic and methacrylic copolymers with fluoropolymers or with monoalkyl or dialkylamines, fluoropolymers, polyolefins, polystyrenes, such as polyvinylidene fluoride resins, terpolymers of styrene, methyl methacrylate, and a silane, such as triethoxy silane, tetrafluoroethylenes, other known coatings and the like.

The carrier particles can be mixed with the toner particles in various suitable combinations. The toner concentration is usually about 2% to about 10% by weight of toner and about 90% to about 98% by weight of carrier. However, one skilled in the art will recognize that different toner and carrier percentages may be used to achieve a developer composition with desired characteristics.

Toners of the present disclosure can be used in known electrostatographic imaging methods. Thus for example, the toners or developers of the disclosure can be charged, e.g., triboelectrically, and applied to an oppositely charged latent image on an imaging member such as a photoreceptor or ionographic receiver. The resultant toner image can then be transferred, either directly or via an intermediate transport member, to a support such as paper or a transparency sheet. The toner image can then be fused to the support by application of heat and/or pressure, for example with a heated fuser roll.

It is envisioned that the toners of the present disclosure may be used in any suitable procedure for forming an image with a toner, including in applications other than xerographic applications.

Specific embodiments of the disclosure will now be described in detail. These Examples are intended to be illustrative, and the disclosure is not limited to the materials, conditions, or process parameters set forth in these embodiments. All parts and percentages are by weight unless otherwise indicated.

EXAMPLES

Resin Emulsion A

A sulfonated polyester resin emulsion is prepared as follows.

A sulfonated polyester resin containing 3.75 moles of sulfonation is prepared by a polycondensation reaction. The resin is ground into powder by milling. To 4400 mL of water in a reactor, is added 12.0 g NEOGEN RK® (anionic surfactant) and 8.2 g CA 897 (nonionic surfactant) and stirred at a speed of 500 rpm with a pitch blade turbine until dissolved. To this mixture is added 616 g of polyester resin powder, and the temperature of the reactor is raised to 85° C. and allowed to stir for a period of 4 hours in order to dissipate the resin into an emulsion containing about 36 nm sulfonated polyester resin particles suspended in water. The reactor is then cooled down to room temperature, and the emulsion discharged. The emulsion contains 14.0 weight percent resin and 86.0 weight percent water.

Resin Emulsion B

A sulfonated polyester resin emulsion is prepared as follows.

A sulfonated polyester resin containing 3.75 moles of sulfonation is prepared by a polycondensation reaction. The resin is ground into powder by milling. To 2000 mL of water in a reactor, is added 5.45 g NEOGEN RK® (anionic surfactant) and 1.9 g CA 897 (nonionic surfactant) and stirred at a speed of 500 rpm with a pitch blade turbine until dissolved. To this mixture is added 280 g of polyester resin powder, and the temperature of the reactor is raised to 80° C. and allowed to stir for a period of 4 hours in order to dissipate the resin into an emulsion containing about 45 nm sulfonated polyester resin particles suspended in water. The reactor is then cooled down to room temperature, and the emulsion discharged. The emulsion contains 14.0 weight percent resin and 86.0 weight percent water.

Pigment Dispersion

A pigment dispersion of an aqueous dispersion of Blue 15.3 pigment, obtained from Sun Chemicals, is used. The pigment dispersion contains an anionic surfactant. The content of the pigment dispersion is 26.5 percent pigment, 2 percent surfactant, and 71.5 percent water.

Example 1

A toner is prepared as follows. To 350 g deionized water is added 687 g of the polyester resin A and 14.3 g of the colorant dispersion in a 2 L glass reactor. To the mixture is added 3.0 g PAC (polyaluminum chloride) and 30 g of 0.1M nitric acid while being polytroned with an IKA homogenizer at a speed of 4000 rpm. The mixture is stirred and heated to a temperature of 62° C. The particle growth is monitored during the heat-up step. The particle size obtained is 4.3 microns with a GSD of 1.19.

The reactor temperature is next raised to 64° C. and allowed to stir for 4 hours. The result is particles having a particle size of 7.4 microns and a GSD of 1.17. The particles have a circular shape having a circularity of 0.978. The particles are washed 4 times with deionized water and dried on a freeze drier.

The thus formed toner composition is tested for its charging properties.

Comparative Example 1

A toner composition is made as in Example 1, except that the coagulant zinc acetate is used instead of polyaluminum chloride. The formed toner particles are similar in size and properties to those of Example 1, and have similar charging properties.

Example 2

A toner composition is made as in Example 1, except that the coagulant used is 4.0 g polyaluminum chloride, and the aggregation temperature is 62° C.

Example 3

A toner composition is made as in Example 1, except that the resin latex used is latex emulsion B. The resultant toner particles have a particle size of 5.0 microns and a GSD of 1.19.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A process for preparing a toner, comprising:

mixing a resin emulsion, a colorant dispersion, and an optional wax to form a mixture;

adding an organic or an inorganic acid to said mixture;

adding a polyion coagulant to said mixture;

heating the mixture, permitting aggregation and coalescence of said resin and colorant, and optionally cooling the mixture and isolating the product, wherein the polyion coagulant is added to said mixture at least one of before or during said heating and wherein the polyion coagulant is selected from the group consisting of tetraalkyl titinates, dialkyltin oxide, tetraalkyltin oxide hydroxide, dialkyltin oxide hydroxide, dibutyltin oxide, dibutyltin oxide hydroxide and tetraalkyl tin.

2. The process of claim 1, wherein the resin is a polyester resin.

3. The process of claim 2, wherein the polyester resin is selected from the group consisting of polyethylene-terephthalate, polypropylene-terephthalate, polybutylene-terephthalate, polypentylene-terephthalate, polyhexalene-terephthalate, polyheptadene-terephthalate, polyoctalene-terephthalate, polyethylene-sebacate, polypropylene sebacate, polybutylene-sebacate, polyethylene-adipate, polypropylene-adipate, polybutylene-adipate, polypentylene-adipate, polyhexalene-adipate, polyheptadene-adipate, polyoctalene-adipate, polyethylene-glutarate, polypropylene-glutarate, polybutylene-glutarate, polypentylene-glutarate, polyhexalene-glutarate, polyheptadene-glutarate, polyoctalene-glutarate polyethylene-pimelate, polypropylene-pimelate, polybutylene-pimelate, polypentylene-pimelate, polyhexalene-pimelate, polyheptadene-pimelate, poly(propoxylated bisphenol-fumarate), poly(propoxylated bisphenol-succinate), poly(propoxylated bisphenol-adipate), poly(propoxylated bisphenol-glutarate), sulfonated forms of the preceding resins, and mixtures thereof.

4. The process of claim 2, wherein the polyester resin is a sulfonated polyester resin.

5. The process of claim 1, further comprising mixing a wax with said resin emulsion.

6. The process of claim 1, wherein the polyion coagulant is present in an amount of from about 0.05 to about 10 percent by weight of the amount of the resin.

7. The process of claim 1, wherein the polyion coagulant is added to said mixture before said heating.

8. The process of claim 1, wherein the polyion coagulant is added to said mixture during said heating.

9. The process of claim 1, wherein the polyion coagulant is added to said mixture both before and during said heating.

10. The process of claim 1, wherein the organic or an inorganic acid is selected from the group consisting of hydrochloric acid, nitric acid, sulfuric acid, phosphoric acid, citric acid, and acetic acid.

11. The process of claim 1, further comprising adding at least one surfactant to said resin emulsion.

12. The process of claim 1, wherein at least about 75% by weight of the polyion coagulant is incorporated into the toner particles during particle aggregation.

* * * * *